(12) United States Patent
Pülmanns et al.

(10) Patent No.: US 6,450,552 B1
(45) Date of Patent: Sep. 17, 2002

(54) SANITARY FIXTURE, MORE PARTICULARLY A WASH-STAND FIXTURE

(75) Inventors: Gerhard Pülmanns, Tönisvorst; Thomas Andreier, Düsseldorf, both of (DE)

(73) Assignee: Hansa Metallwerke AG (DE)

( * ) Notice: Subject to any disclaimer, the term of this patent is extended or adjusted under 35 U.S.C. 154(b) by 0 days.

(21) Appl. No.: 09/489,572

(22) Filed: Jan. 21, 2000

(30) Foreign Application Priority Data

Jan. 22, 1999 (DE) .......................................... 199 02 397

(51) Int. Cl.[7] ............................................... F16L 21/00
(52) U.S. Cl. ...................... 285/376; 285/124.3; 285/401
(58) Field of Search .......................... 285/124.1, 124.3, 285/FOR 118, 376, 401, 360

(56) References Cited

U.S. PATENT DOCUMENTS

| | | | | |
|---|---|---|---|---|
| 2,510,125 A | * | 6/1950 | Meakin | 285/124.1 |
| 3,929,356 A | * | 12/1975 | DeVincent et al. | 285/305 |
| 4,449,737 A | * | 5/1984 | Specht | 285/7 |
| 4,905,576 A | * | 3/1990 | Reynolds | 92/128 |
| 5,354,101 A | * | 10/1994 | Anderson, Jr. | 285/25 |
| 6,092,844 A | * | 7/2000 | Lee | 285/90 |

* cited by examiner

Primary Examiner—Lynne H. Browne
Assistant Examiner—Kenn Thompson

(57) ABSTRACT

A sanitary fixture comprises a fixture housing, in which a receiving chamber for at least one element controlling the water flow, e.g. a plate cam cartridge, is constructed. The receiving chamber is sealed at the bottom by a base (1). Secured in at least one through bore (2, 3, 15, 20) of the base (1) is a pipe connector (4), via which the water is supplied to the sanitary fixture from the domestic line. The pipe connector (4) is provided for axial securing to the base (1) with a circumferential bead (16), which is not completely circular, but comprises a recess (17) in a given circumferential region. The through bore (2, 3, 15, 20) in the base (1) comprises a lower, effective inlet aperture for the pipe connector (4), which has a non-circular cross section. Only after an undercut does the through bore (2, 3, 15, 20) then continue in known manner with a circular cross section. The pipe connector (4) can be introduced in a given rotary position into the through bore (2, 3, 15, 20) of the base (1) and is then rotated within said bore (2, 3, 15, 20). During this rotation, a given region of the circumferential bead (16) comes to lie behind the undercut, so that the pipe connector (4) is axially secured.

17 Claims, 3 Drawing Sheets

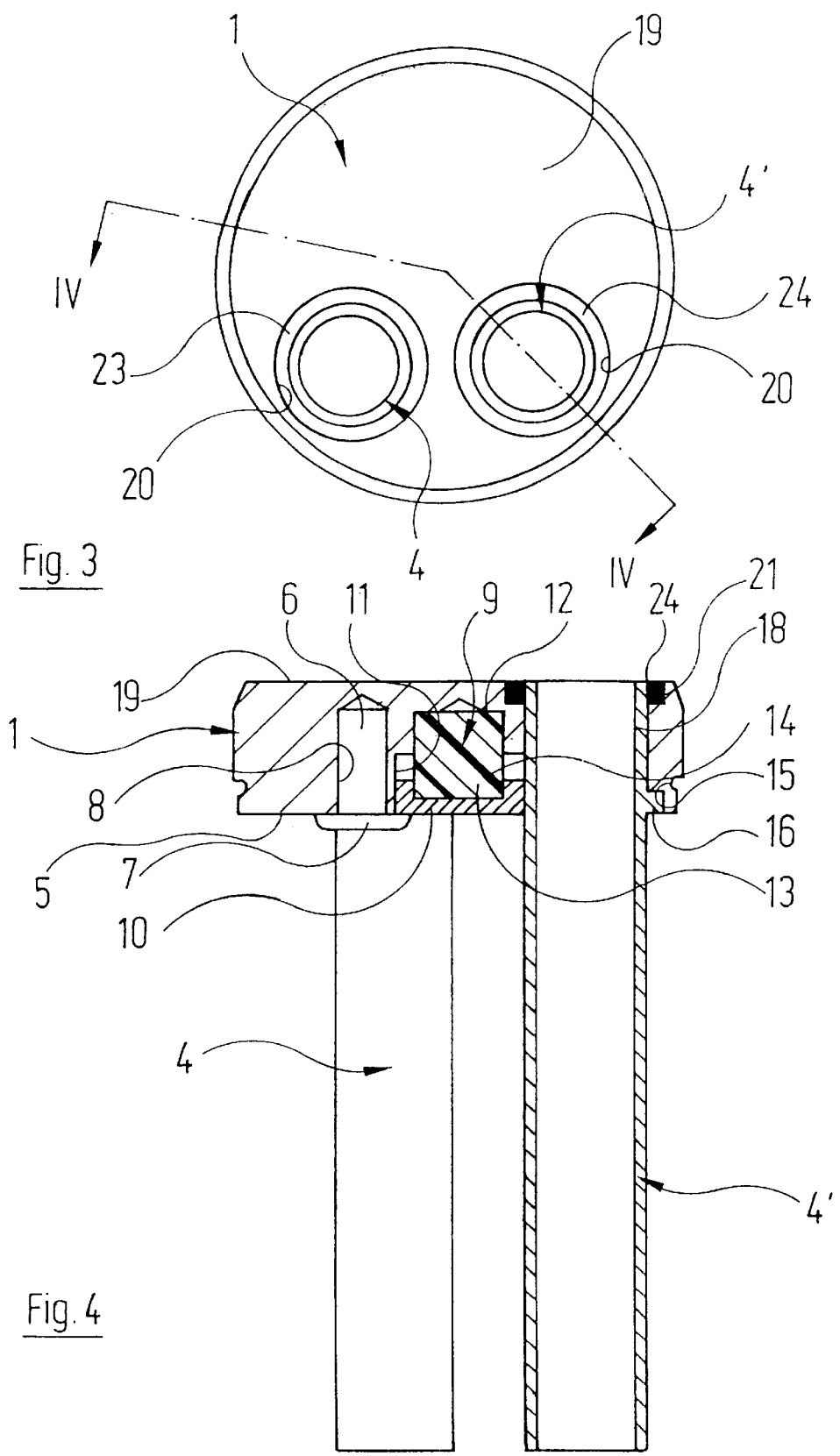

SANITARY FIXTURE, MORE PARTICULARLY A WASH-STAND FIXTURE

The invention relates to a sanitary fixture, more particularly a wash-stand fixture, with a fixture housing; with a receiving chamber constructed in the fixture housing for at least one element controlling the water flow; with a base sealing the receiving chamber at the bottom; with at least one pipe connector, which is detachably secured in a through bore of the base and for axial securing comprises a circumferential bead, which rests with an end face against a diameter step of the through bore.

A sanitary fixture of this type is described in DE 31 19 313 C2. In this case, the base is formed by two base sections, which are connected to one another by mechanical positive locking and between which the circumferential bead of the pipe connectors is received, The arrangement is such that the pipe connectors are reliably axially fixed in both directions without said pipe connectors influencing the element which controls the water flow and is accommodated in the receiving chamber. Disadvantageous in this case is that the assembly of the pipe connectors must already take place in the factory and it is necessary to fully dismantle the fixture, including the separation of the two base sections, in order to release the pipe connectors.

In the sanitary fixture described in DE 23 31 000, the circumferential beads of the pipe connectors are axially secured between the upper side of the base and the underside of the control cartridge, which is the element controlling the water flow in this case. In this design, it cannot be ruled out that forces are exerted by the pipe connectors upon the ceramic disks, which are accommodated within the control cartridge. Furthermore, assembly or dismantling of the pipe connectors is also only possible so long as the control cartridge is not in the receiving chamber of the sanitary fixture.

Plug connections for pipe connectors of sanitary fixtures are described in EP 0 472 022 A1 and EP 0 519 244 A1. Although these plug connections allow for an (optionally also subsequent) insertion of the pipe connectors into the base of the sanitary fixture, the pipe connectors cannot be subsequently released, or at any rate not easily.

Finally, in the sanitary fixture described in EP 0 681 127 A1, the fixing of the pipe connectors is effected, instead of by a moulded-on, projecting circumferential bead, by an inserted snap ring, the positive-locking axial fixing of the pipe connectors also only being complete when the control cartridge is fitted into the fixture housing.

It is the object of the present invention to design a sanitary fixture of the initially stated type in such a manner that the pipe connector can be fitted in a cost-effective manner from the outside onto the otherwise fully assembled sanitary fixture and if necessary can also be released again.

This object is attained according to the invention in that a) the through bore comprises a lower, effective inlet aperture for the pipe connector which has a non-circular cross section and extends via an undercut into a region of the through bore lying further inwards and having a circular cross section;

b) the circumferential bead of the pipe connector is provided with a recess in such a manner that it can be introduced in a given rotary position into the effective inlet aperture of the through bore and then axially secured behind the undercut by a rotation.

Thus, according to the invention, the region of the through aperture having a circular cross section is closed on one side by a part forming an undercut. The end of the pipe connector facing the base can therefore only be pushed into the effective inlet aperture of the through bore, which in this manner has a non-circular cross section, in a given rotary position, in which the circumferential bead, on account of its recess, can be moved past the part forming the undercut. By way of a subsequent rotary movement, a given region of the circumferential bead is then brought behind the part forming the undercut; the pipe connector can now no longer be removed by pulling axially. However, the pipe connector can be "unlocked" by rotation in the opposite direction, so that it can be removed in an axial direction from the base.

In principle, it is possible to mould the part forming the undercut and resulting in an effective inlet aperture of non-circular cross section integrally onto the lower region of the through bore. However, it is more cost-effective if the effective inlet aperture into the through bore of the base is partially restricted by a part which is secured to the lower end face of the base, projects partially over the through aperture and thereby forms the undercut.

Particularly preferred in this respect for reasons of cost is an embodiment in which the part forming the undercut is the head of a rivet, whose shaft is accommodated in a bore of the base.

In order to prevent unintentional release of the pipe connectors by accidental rotation, a development of the invention is recommended in which a rotary stop device is provided, by means of which the pipe connector can be secured against rotation within the through bore in a rotary position, in which the circumferential bead of the pipe connector is axially secured by the undercut.

An expedient development of a rotary stop device of this type comprises a press element, which in the locking position engages in the recess on the circumferential bead of the pipe connector and for unlocking can be moved axially against the force of a spring element to such a degree that the circumferential bead of the pipe connector is released from the press element.

The press element of a rotary stop device of this type requires a device which prevents the press element from being forced out of the base by the spring element. This can be expediently realised in such a manner that the press element of the rotary stop device is forced by the spring device in the direction of that part secured to the lower end face of the base which forms the undercut. This part then has a double role.

An embodiment of the invention will be explained in further detail in the following with the aid of the drawings, in which:

FIG. 3 is a plan view of the base of FIG. 1;

FIG. 4 is a section taken along the angled line IV—IV of FIG. 3;

Figure 1:
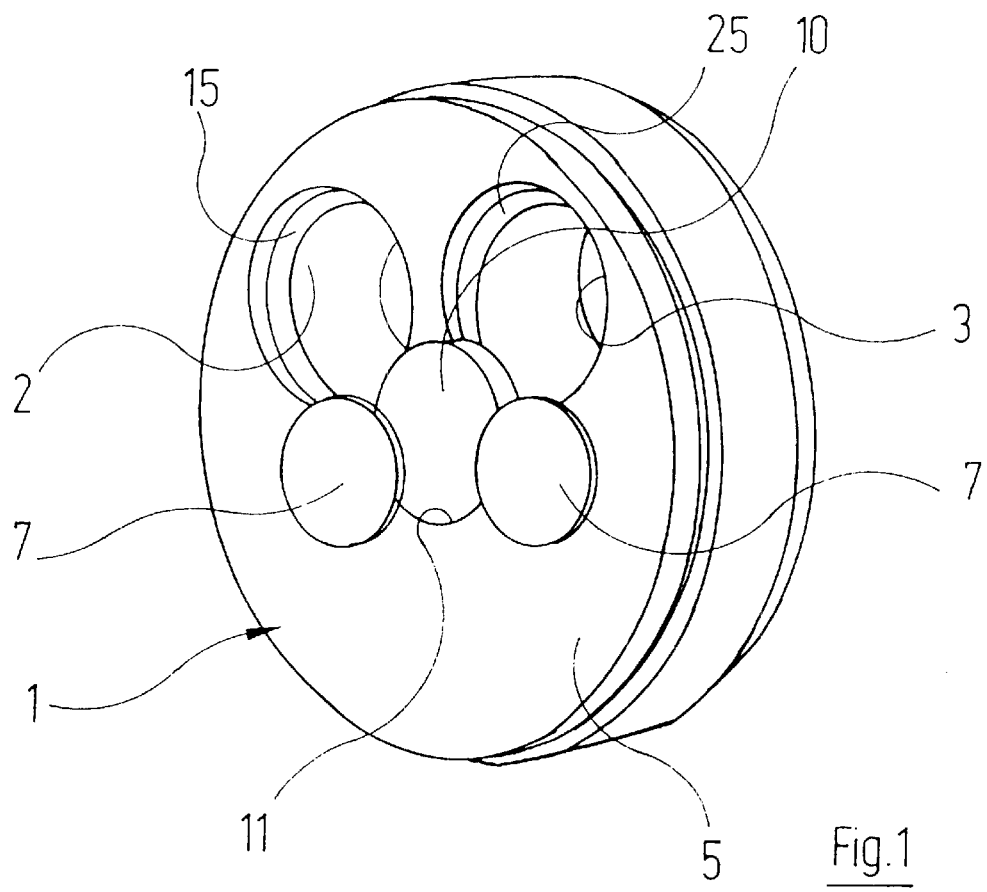
FIG. 1 is a perspective view of the base of a sanitary wash-stand fixture without inserted pipe connectors.

FIG. 1 is a perspective view from below and at an angle showing the base 1 of a sanitary wash-stand fixture, for example a single lever mixer. The illustrated base 1 is a separate element, which is fitted into a fixture housing, not shown. However, it could also be integrally moulded onto the fixture housing. Fitted onto the circular end face 19 of the base 1 remote from the direction of viewing in FIG. 1 (cf. FIG. 4) in the assembled sanitary fixture is a cartridge (not shown), which in known manner comprises the elements controlling the water flow, e.g. displaceable ceramic disks.

Figure 2:
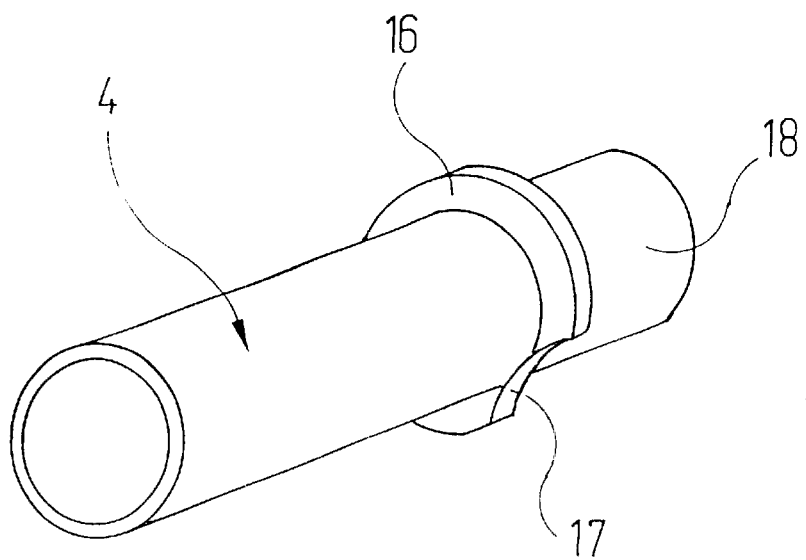
FIG. 2 is a perspective view of a pipe connector for use with the base shown in FIG. 1.
Figure 5:
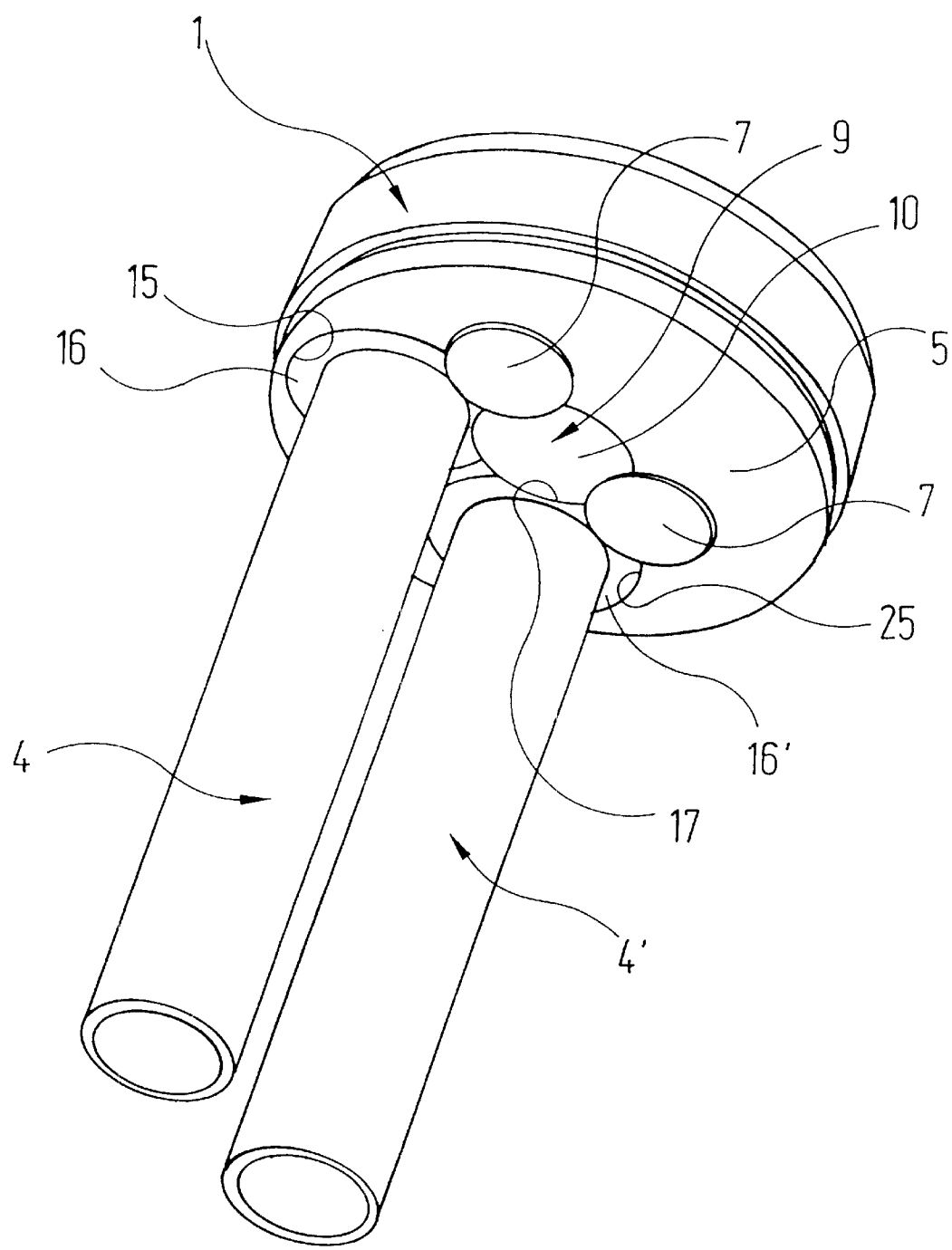
FIG. 5 is a perspective view of the base of FIG. 1 with inserted pipe connectors according to FIG. 2.

The base 1 comprises two stepped through bores 2, 3 with enlarged sections 15, 25 on both sides for receiving pipe connectors 4, one of which is illustrated in FIG. 2. The through bores 2, 3 have a circular cross section, but are each partially covered at the circular end face 5 which is visible in FIG. 1 and faces downwards in the assembled position of the sanitary fixture, by a head 7 of a rivet 6 having an enlarged diameter. In this manner, an effective inlet aperture into the through bores 2 and 3 is formed deviating from a circular cross section with an undercut lying behind the region of the rivet heads 7 projecting into the through bores 2, 3. As shown in FIG. 4, the rivets 6 are secured in bores a of the base 1, e.g. are driven into said bores.

Additionally integrated into the base 1 is a rotary stop device, which is provided in its entirety with the reference 9 in FIG. 4. The rotary stop device 9 comprises a button-like press element 10 having a circular cross section, which is arranged in a bore 11 of the base 1 so as to be axially displaceable. Clamped between the end face of the press element 10 facing the interior of the base 1 and the base of a blind bore 12 deepening the bore 11 with a reduced diameter is a spring element 13. In the illustrated embodiment, the spring element 13 has the form of an elastomer block, which is accommodated at its upper end in FIG. 4 in the blind bore 12 and at its lower end in FIG. 4 in a corresponding recess 14 on the rear side of the press element 10. The arrangement is such that the press element 10 is forced outwards by the spring device 13. The distance between the axes of the bores 8 and 11 in the base 1 as well as the diameters of the rivet heads 7 and press element 10 are coordinated in such a manner that the peripheral region of the press element 10 is held by the rivet heads 7 in the bore 11 of the base 1.

As can be seen in particular from FIG. 1, the bore 11, in which the press element 10 moves axially, intersects the through bores 2 and 3 of the base 1. The press element 10 fitted into the bore 11 therefore projects partially into the widened end regions 15 of the bores 2, 3.

The pipe connector 4 illustrated in FIG. 4 is a connection element which is connected in a sealing-tight manner to a supply hose, not shown. The pipe connector 4 could also be the end region of a conventional supply pipe. Constructed on the outer cylindrical surface of the pipe connector 4 is a circumferential bead 16, which has a larger external diameter than the rest of the pipe connector 4. The circumferential bead 16 can be formed, for example, by compression, but then generally has edges which are not as sharp as those shown in FIG. 2. The circumferential bead 16 is not a fully closed ring; rather it is interrupted by an arched recess 17. The diameter of the recess 17 corresponds to the diameter of the press element 10 of the rotary stop device 9.

The pipe connector 4 of FIG. 2 is secured in the base 1 of FIG. 1 in the following manner.

The end region 18 of the pipe connector 4 projecting beyond the circumferential bead 16 is introduced into one of the through bores 2, 3, the rotary position of the pipe connector 4 within the through bore 2, 3 being such that the recess 17 of the pipe connector 4 faces the region of the corresponding rivet head 7 projecting into the respective enlarged section 15 of the through bore 2, 3. In this angular position, the circumferential bead 16 can be pushed past the rivet head 7 into the enlarged section 15 of the through bore 2, 3, until the rear annular end face of the circumferential bead 16 in FIG. 2, which in the assembled position of the sanitary fixture is the upper end face, comes to rest against the annular step between the enlarged section 15 and the through bore 2, 3. The axial depth of the annular enlarged section 15 is such that the front annular end face of the circumferential bead 16 in FIG. 2, which is therefore the lower end face in the assembled position of the sanitary fixture, is aligned with the end face 5 of the base 1. In this position, the pipe connector 4 is then rotated within the through bore 2 in an anti-clockwise direction in the view of FIG. 1 and within the through bore 3 in a clockwise direction. During this rotation, a given region of the circumferential bead 16 travels behind the corresponding rivet head 7.

When the pipe connector 4 is pushed into the bore 2, the press element 10 of the rotary stop device 9 is firstly forced backwards by the circumferential bead 16 of the pipe connector 4 against the force of the spring device 13. When the recess 17 of the pipe connector 4 comes into alignment with the press element 10 during the rotary movement of the pipe connector 4, the press element 10 snaps axially outwards under the influence of the spring device 13, until it comes to rest again with its end face against the corresponding rivet head 7. The press element 10 now engages with a circumferential region into the recess 17 of the inserted pipe connector 4, so that the latter is also locked against rotary movements.

A further pipe connector is then introduced in corresponding fashion into the second through bore 2, 3.

In order to dismantle the pipe connectors 4, the press element 10 of the rotary stop device 9 is forced backwards manually or by means of a suitable tool against the force of the spring device 13, until it is released from the circumferential bead 16 of the pipe connector 4. The pipe connectors 4 can then be rotated back again, until the recesses 17 are aligned with the corresponding rivet heads 7. The pipe connectors 4 can then be withdrawn axially.

As FIG. 4 shows, the region 18 of the pipe connectors 4 projecting beyond the circumferential bead 16 is approximately of such a length that it extends into the vicinity of the upper end face 19 of the base 1 (cf. FIG. 4). Disposed in each of the enlarged sections 20 of the through bores 2, 3 at this location is an O-ring 23, 24, which seals the upper end of the respective pipe connector 4 relative to the base 1.

What is claimed is:

1. A sanitary fixture, more particular a wash-stand fixture, with a fixture housing; with a receiving chamber constructed in the fixture housing for at least one element controlling the water flow; with a base sealing the receiving chamber at the bottom; with at least one pipe connector, which is detachably secured in a through bore of the base and for axial securing comprises a circumferential bead, which rests with an end face against a diameter step of the through bore, characterised in that
   a) the through bore (2, 3, 15, 20) comprises a lower, effective inlet aperture for the pipe connector (4) which has a non-circular cross section and extends via an undercut into a region of the through bore (2, 3, 15, 20) lying further inwards and having a circular cross section;
   b) the circumferential bead (16) of the pipe connector (4) is provided with a recess (17) in such a manner that it can be introduced in a given rotary position into the effective inlet aperture of the through bore (2, 3, 15, 20) and then axially secured behind the undercut by a rotation.

2. A sanitary fixture according to claim 1, characterised in that the effective inlet aperture into the through bore (2, 3, 15, 20) of the base (1) is partially restricted by a part (7) arranged on the lower end face (5) of the base (1), which projects partially over the through bore (2, 3, 15, 20) and thereby forms the under cut.

3. A sanitary fixture according to claim 2, characterized in that the part forming the undercut is the head (7) of a rivet (6), whose shaft is accommodated in a bore (8) of the base (1).

4. A sanitary fixture according to claim 1, characterised in that a rotary device (9) is provided, by means of which the pipe connector (4) can be secured against rotation within the through bore (2, 3, 15, 20) in a rotary position in which the circumferential bead (16) of the pipe connector (4) is axially secured by the undercut.

5. A sanitary fixture according to claim 4, characterised in that the rotary stop device (9) comprises a press element (10), which engages in the locking position in the recess (17) on the circumferential bead (16) of the pipe connector (4) and for unlocking can be moved axially against the force of a spring element (13) to such a degree that the circumferential bead (16) of the pipe connector (4) is released from the press element (10).

6. A sanitary fixture according to claim 2, characterised in that a rotary stop device (9) is provided, by means of which the pipe connector (4) can be secured against rotation within the through bore (2, 3, 15, 20) in a rotary position in which the circumferential bead (16) of the pipe connector (4) is axial secured by the undercut.

7. A sanitary fixture according to claim 3, characterised in that a rotary, stop (9) is provided, by means of which the pipe connector (4) can be secured against rotation within the through bore (2, 3, 15, 20) in a rotary position in which the circumferential bead (16) of the pipe connector (4) is axially secured by the undercut.

8. A sanitary fixture according to claim 6, characterised in that the rotary stop device (9) comprises a press element (10), which engages in the locking position in the recess (17) on the circumferential bead (16) of the pipe connector (4) and for unlocking can be moved axially against the force of a spring element (13) to such a degree that the circumferential bead (16) of the pipe connector (4) is released from the press element (10).

9. A sanitary fixture according to claim 7, characterised in that the rotary stop device (9) comprises a press element (10), which engages in the locking position in the recess (17) on the circumferential bead (16) of the pipe connector (4) and for unlocking can be moved axially against the force of a spring element (13) to such a degree that the circumferential bead (16) of the pipe connector (4) is released from the press element (10).

10. A sanitary fixture according to claim 8, characterised in that the press element (10) of the rotary stop device (9) is forced by the spring device (13) in a direction of a part (7) secured to the lower end face of the base (1) which forms the undercut.

11. A sanitary fixture according to claim 9, characterised in that the press element (10) of the rotary stop device (9) is forced by the spring device (13) in a direction of a part (7) secured to the lower end face of the base (1) which forms the undercut.

12. A sanitary fixture, more particular a wash-stand fixture, with a fixture housing; with a receiving chamber constructed in the fixture housing for at least one element controlling the water flow, with a base sealing the receiving chamber at the bottom; with at least one pipe connector, which is detachably secured in a through bore of the base and for axial securing comprises a circumferential bead, which rests with an end face against a diameter step of the through bore, characterized in that
  a) the through bore (2, 3, 15, 20) comprises a lower, effective inlet aperture for the pipe connector (4) which has a non-circular cross section and extends via, an undercut into a region of the through bore (2, 3, 15, 20) lying further inwards and having a circular cross section;
  b) the circumferential bead (16) of the pipe connector (4) is provided with a recess (17) in such a manner that it can be introduced in a given rotary position into the effective inlet aperture of the through bore (2, 3, 15, 20) and then axially secured behind the undercut by a rotation,
  c) the effective inlet aperture into the through bore (2, 3, 15, 20) of the base (1) is partially restricted by a part (7) arranged on the lower end face (5) of the base (1), which projects partially over the through aperture (2, 3, 15, 20) and thereby forms the under cut, and
  d) the part forming the undercut is the head (7) of a rivet (6), whose shaft is accommodated in a bore (8) of the base (1).

13. A sanitary fixture according to claim 12, characterized in that a rotary stop device (9) is provided, by means of which the pipe connector (4) can be secured against rotation within the through bore (2, 3, 15, 20) in a rotary position in which the circumferential bead (16) of the pipe connector (4) is axially secured by the undercut.

14. A sanitary fixture according to claim 13, characterised in that the rotary stop device (9) comprises a press element (10), which engages in the locking position in the recess (17) on the circumferential bead (16) of the pipe connector (4) and for unlocking can be moved axially against the force of a spring element (13) to such a degree that the circumferential bead (16) of the pipe connector (4) is released from the press element (10).

15. A sanitary fixture, more particular a wash-stand fixture, with a fixture housing; with a receiving chamber constructed in the fixture housing for at least one element controlling the water flow; with a base sealing the receiving chamber at the bottom; with at least one pipe connector, which is detachably secured in a through bore of the base and for axial securing comprises a circumferential bead, which rests with an end face against a diameter step of the through bore, characterized in that
  a) the through bore (2, 3, 15, 20) comprises a lower, effective inlet aperture for the pipe connector (4) which has a non-circular cross section and extends via an undercut into a region of the through bore (2, 3, 15, 20) lying further inwards and having a circular cross section;
  b) the circumferential bead (16) of the pipe connector (4) is provided with a recess (17) in such a manner that it can be introduced in a given rotary position into the effective inlet aperture of the through bore (2, 3, 15, 20) and then axially secured behind the undercut by a rotation;
  c) the effective inlet aperture into the through bore (2, 3, 15, 20) of the base (1) is partially restricted by a part (7) arranged on the lower end face (5) of the base (1), which projects partially over the through bore (2, 3, 15, 20) and thereby forms the under cut, and
  d) a rotary stop device (9) is provided, by means of which the pipe connector (4) can be secured against rotation within the through bore (2, 3, 15, 20) in a rotary position in which the circumferential bead (16) of the pipe connector (4) is axially secured by the undercut.

16. A sanitary fixture according to claim 15, characterised in that the rotary stop device (9) comprises a press element (10), which engages in the locking position in the recess (17) on the circumferential bead (16) of the pipe connector (4) and for unlocking can be moved axially against the force of a spring element (13) to such a degree that the circumferential bead (16) of the pipe connector (4) is released from the press element (10).

17. A sanitary fixture according to claim 16, characterised in that a press element (10) of the rotary stop device (9) is forced by the spring device (13) in the direction of said part (7) secured to the lower end face of the base (1) which forms the undercut.

* * * * *